May 20, 1952 K. A. BROWN 2,597,615
TRACTOR ATTACHMENT
Filed June 13, 1947 2 SHEETS—SHEET 1

INVENTOR.
Kenneth A. Brown
BY
Attorney

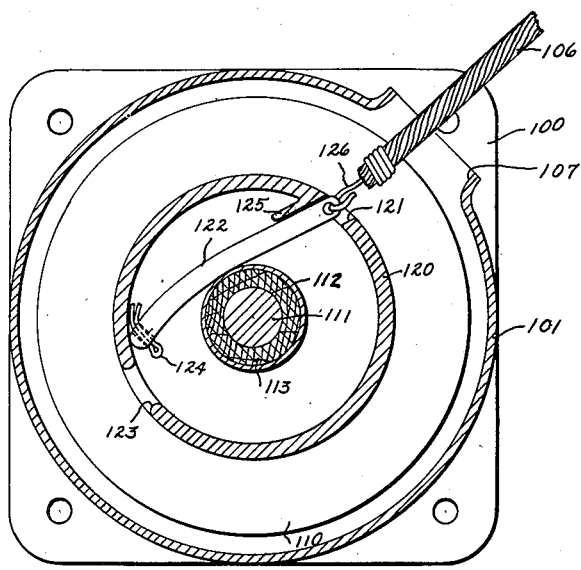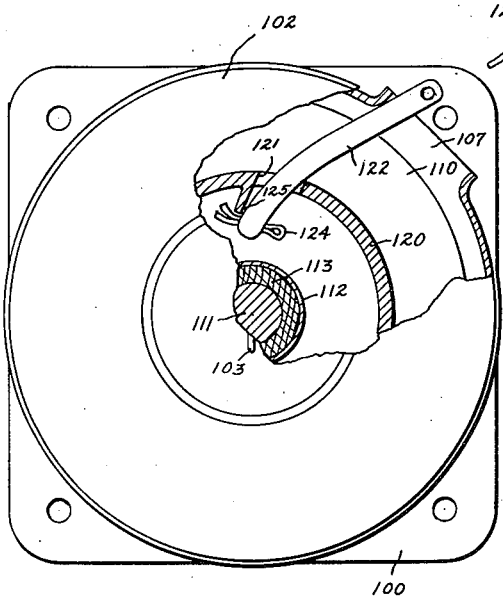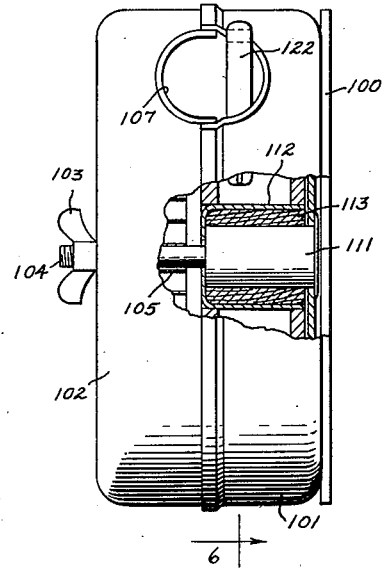

Patented May 20, 1952

2,597,615

UNITED STATES PATENT OFFICE 2,597,615

TRACTOR ATTACHMENT

Kenneth A. Brown, Gervais, Oreg.

Application June 13, 1947, Serial No. 754,386

2 Claims. (Cl. 242—107)

My present invention relates to an agricultural implement of utility in connecting a prime mover such as a tractor to a towed implement such as a plow, harrow or other agricultural implement of similar character having a controllable element. It is common practice in modern farm machinery to provide the working implement, such as a plow, with a controlled element such as a plow share, the control thereof comprising means whereby the plow share may be raised from the ground or lowered into plowing contact with the ground at will. Another example is a hay rake which has its tines lowered to a position close to the ground in order to collect hay or the like, and when a sufficient amount has been collected, the tines can be momentarily raised to clear the accumulated pile, thus enabling the formation of windrows of hay which may then be easily pitched into a truck or formed into small piles.

Many other implements for use in agriculture, or in road building or other industrial pursuits, are provided with control means which operate some controllable element of the implement. It is desirable that such control means be connected to the towing vehicle so that the driver of the towing vehicle may operate the same without leaving the driver's seat.

An object of the present invention is to provide a reel upon which a length of cord or cable may be accumulated, which reel may be located adjacent the driver's seat of the towing vehicle and from which the cord or cable may extend to the controllable element of the towed implement.

An object of the present invention is to provide a take-up reel which will keep the control cable taut at all times so that it will not become fouled with the wheels or other portions of the combination when turning at the end of an operation or otherwise forming a sharp angle in the direction of movement.

A further object of the present invention is to provide a take-up reel having means whereby the cable or cord will run freely from the take-up reel if the driver forgets to disengage the cable or cord from the towed implement upon disconnecting the prime mover therefrom.

Another object of the present invention is to provide a take-up reel so arranged that the movement of the combination of prime mover and towed implement will not ordinarily cause chafing of the cord or cable on the lip or mouth of the take-up reel, so as to prolong the life of the cable or cord.

A further object of the present invention is to provide a take-up reel in combination with a prime mover having a driver's seat which is so arranged that the cable runs freely therefrom when desired and may be easily reached from the driver's seat in order to operate the towed implement.

The foregoing and other objects and advantages of the present invention will be more readily apparent from the inspection of the accompanying drawing taken in connection with the following specification wherein like numerals refer to like parts throughout.

In the drawings Fig. 1 is a side elevation of a take-up reel made in accordance with my present invention;

Fig. 6 is a vertical section through a modified form of the invention, taken substantially along line 6—6 of Fig. 8, and showing a modified form of means for attaching a rope to the pulley;

Fig. 7 is a plan view of the modified form with parts broken away and showing the rope leaving the pulley; and Fig. 8 is a side view of the modified form with a part broken away.

Figure 1:
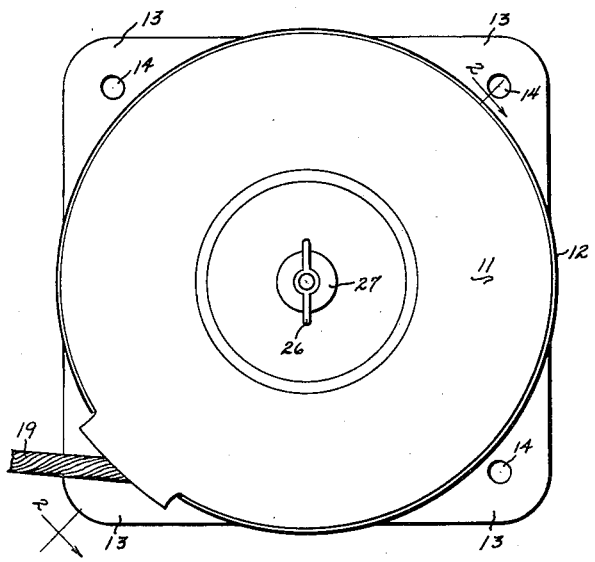
Figure 2:
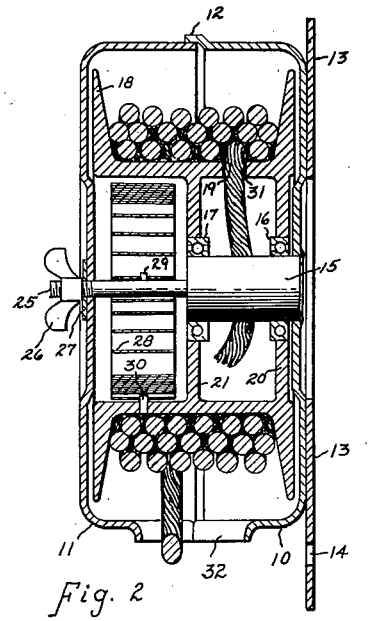
Fig. 2 is a section taken through the take-up reel along the line 2—2 of Fig. 1.

The device of the present invention, as illustrated in Figs. 1 and 2, preferably comprises a pair of complementary stamped shells 10 and 11, the shell 10 having a peripheral flange 12 of sufficient diameter to embrace the lip of the shell 11, the two thereby forming a substantially cylindrical hollow case. The shell 10 is preferably provided with a plurality of ears 13 having openings 14 therethrough, by means of which the shell may be bolted or screwed to a portion of a tractor or the like.

A post 15 of substantial diameter extends axially from the shell 10 and is embraced by a pair of bearing assemblies 16 and 17, forming spaced supports for a pulley 18, the sheaved portion of which is of considerable depth and the base diameter of which is substantially half that of the shell 10 so that a considerable space is provided for the reception of a plurality of convolutions of rope or cable 19. The central portion of the sheave is provided by a pair of spaced flanges 20 and 21 engaging the outer raceways of the bearing assemblies 16 and 17 respectively, leaving a hollow annular space surrounding the hub 15. A reduced extension 25 of the hub 15 extends through an opening in the shell 11 and is threaded for reception of a wing nut 26.

A washer 27 is preferably slipped over the extension 25 to bear against the shell 11 and take the pressure of the wing nut 26 in order to hold the two shells in assembled relation. A large coil spring 28 is attached to the extension 25 by means of a pin 29 extending outwardly from the extension 25 and passing into a hole in the inner end of the coil spring. The outer end of the coil spring is provided with a hole into which extends the end of a pin 30 extending inwardly from the flange of the sheave 18. The sheave is thereby resiliently connected to the shell. Winding of the sheave in one direction will cause tightening of the convolutions of the coil spring 28.

The inner end of the rope 19 is slipped through an opening 31 in the bottom of the sheave 18 and extends freely into the annular space between the flanges 20 and 21. The bulk of the rope is then wrapped about the sheave until the outer end is closely adjacent an opening 32 provided in the cylindrical wall of the completed shell, as by means of bending outwardly the lip of semicircular notches cut in the flanges of the shell sections 10 and 11. The rope is preferably wound upon the sheave while the shell 11 is separated from the shell 10, and after completing the winding the end of the rope may be grasped and the sheave rotated through several revolutions so as to tension the spring 28; thereafter, the shell 11 is placed in position and the wing nut 26 replaced in order that the rope will be held contained within the shell. In order to prevent release of the tension thus applied, the outer end of the rope is preferably attached to a hook 35 which is too large to enter the opening 32. When it is desired to attach the end of the rope to some implement control lever or the like, the hook 35 is grasped and the rope drawn outward to the desired extent, thus further tensioning the spring 28. Upon release of the hook from the implement the spring 28 draws the rope back within the shell until the hook engages the edge of the opening 32.

As seen in Fig. 1, I prefer that the opening 32 should be opposite one of the ears 13, which ears are preferably spaced 90° from each other so that they in effect form corners of a rectangular attachment plate. It is a natural tendency to attach such a plate in such a position that it is either vertical or aligned with the longitudinal axis of the tractor or the like. Therefore it will probably occur, and in the case of those who read directions will certainly occur, that the opening 32 will be positioned in line with the direction of extension of the cord to the implement to which it is attached. Therefore, when due to the unevenness of the ground, or during turning of the tractor, the rope plays in and out as the spring keeps it taut, it will not chafe or rub against the edge of the opening 32. The life of the rope or the like is thereby materially increased, particularly since the edges of the opening 32 are rounded outwardly and it will be against such a round surface that the rope does rub.

Figure 3:
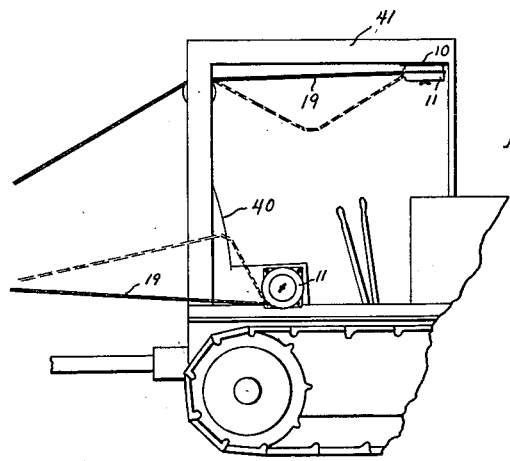
Fig. 3 is a partial view in side elevation of a modern tractor having a plurality of the take-up reels attached thereto.
Figure 4:
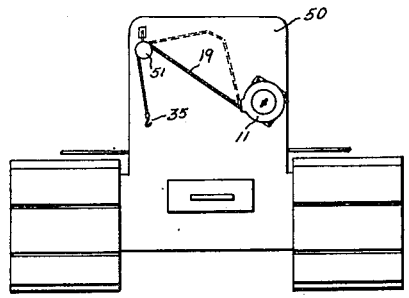
Fig. 4 is a view in rear elevation of another type of tractor having a take-up reel thereon.
Figure 5:
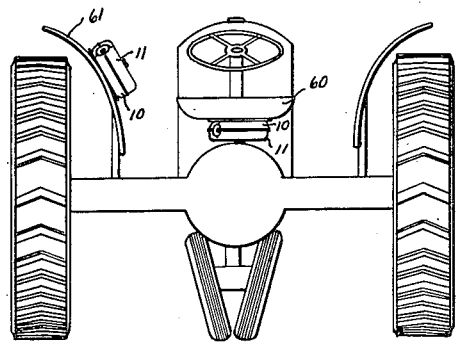
Fig. 5 is a rear view of a third type of tractor having a plurality of take-up reels attached thereto.

In Figs. 3 to 5 inclusive, I have illustrated various positions in which the device of the present invention may be mounted on various tractors or prime movers. In Fig. 3, for example, one or more may be mounted overhead and one or more may be mounted at the side of the bucket seat 40 of a tractor provided with a driver's canopy 41. In case of the overhead mounting, it is a simple matter for the driver to reach upward and pull down upon the cord 19 to thereby operate the implement, and in the case of those mounted to the side of the seat, he may reach down and pull upward upon the cord; since the cord is kept taut by the spring at all times, he is not required to take up slack and the simple motion of grabbing and pulling forward on the rope will always be sufficient to operate the towed implement. In Fig. 4, a take-up reel is applied to the back of a bucket seat 50 and, in this case, is intentionally placed at an angle to the vertical so that the line of extension of the cord is upward to the left in order that the cord may pass about a pulley 51 mounted on the upper left corner of the seat. The driver in this case merely reaches down over the back of the seat and operates the implement by pulling upward on the rope. In Fig. 5, one take-up reel is shown mounted beneath a spring-type seat 60, and a second one mounted on a fender 61 of a different type of tractor, both take-up reels being in position to permit rapid manipulation of the implement or implements towed by the tractor.

It is to be appreciated that the foregoing illustrations are merely exemplary and are given to illustrate the universal application of my invention.

An advantage of the present invention is illustrated by referring to Fig. 2 in which it is seen that the end of the cord or cable 19 is capable of slipping through the opening 31 in the sheave 18. This arrangement is purposely provided inasmuch as a towed implement may break loose from the prime mover, or the driver may unhitch the towed implement without untying the rope therefrom. In either event, the separation of the prime mover and the towed implement will be accompanied by tensioning of the spring 28 until the last convolution of the cable or rope is wholly or partially unwound from the sheave, whereupon the free end will slip through the opening 31 and the rope and sheave will become disassociated. The tension of the spring 28 will be harmlessly dissipated and no portion of the take-up reel will be damaged; no damaging strain will be applied to the implement to which the cord is attached, and the cord will not be broken.

Referring to Figs. 6, 7 and 8, a modified form of the invention is illustrated wherein the take-up reel is protected from damage in the event that the operator forgets to detach the control rope therefrom and starts to drive away from the stationary implement. In the previously described modification the rope may simply pull out of the take-up reel, in which event the spring might be broken as it is suddenly released from full compression. This is eliminated in a modified form by providing means to lock the pulley in fixed position with relation to the housing if the rope is drawn out to its full extent.

In this modification a housing comprising a base plate 100 and a cup-shaped member 101, to which is attached a complementary member 102 held in assembled relationship by a wing nut 103 on a central stud 104. A spring 105 is adapted to be wound taut as previously described in order to draw a cable or rope 106 into the housing through the opening 107. A sheave 110 is rotatably mounted within the housing as previously described, only in this case I prefer to pivot the sheave upon a shaft 111 from which the stud 104 extends, the shaft 111 being welded or otherwise affixed to the bottom of the shell portion 101. A cup-shaped member 112 is also fixed to the bottom of the member 101 and is provided with an opening through which the stud 104 extends, the cup-shaped member surrounding the shaft 111 concentrically at a distance therefrom and providing means to support a bushing 113. The bushing may comprise self lubricating, pressed, powdered metal or hardwood boiled in oil; in either case the bushing is well protected against dust and is not very adversely affected by any dust which might sift into the housing.

The wall 120 of the sheave 110 is provided with an opening 121 through which a locking rod 122 may be inserted. The opposite portion of the wall 120 is provided with an opening 123 through which a cotter pin 124 may be inserted through an end of the locking rod 122 and spread to prevent the locking rod from being withdrawn through the opening 121.

The spring is tensioned to wind the rope onto the sheave in a counterclockwise direction, and the inner surface of the wall 120 is provided with a ledge 125 adjacent to the edge of opening 121 in the counterclockwise direction. The outer end of the rod 122 is provided with an opening through which a wire hook 126 attached to the end of the rope 106 may be passed and bent back to couple the rope to the rod.

The operation of this modification is as follows: With the spring wound tight and the cover member 102 removed the operator may insert the locking rod 122, attached to the end of the rope 106, and engage the locking rod in position by inserting the cotter pin 124. The locking rod 122 is of such length that it may be inserted until its inner end strikes the inner surface of the wall 120, at which position its other end is substantially flush with the wall 120. The operator then may slowly feed the rope onto the sheave while the spring unwinds. When fully assembled the take-up reel may be used as previously described. In the event that the operator forgets to detach the end of the rope from the towed implement or vehicle the rope will be unwound from the sheave until the locking rod 122 is withdrawn through the opening 121 until prevented from further movement by the cotter pin 124. At this point the wire hook 126 will be straightened and the rope released from the take-up reel. The spring will urge the sheave counterclockwise, but will be prevented from moving the sheave beyond the point illustrated in Fig. 7 wherein the locking rod 122 has engaged the edge of the opening 107. The ledge 125 provides a thrust point to prevent the locking rod from rotating about the edge of opening 121.

I prefer having the locking rod slightly bent as shown in order to permit the use of a longer rod than would be possible if it were straight. However, if other proportions of the device were altered a straight rod might suffice.

Having illustrated and described preferred embodiments of my present invention and various positions of use thereof, it should be apparent to those skilled in the art that other modifications in arrangement and detail are permissible. All such modifications as come within the true spirit and scope of the appended claims are considered to be a part of my invention.

I claim:

1. A spring-tensioned take-up reel comprising a case including a side wall having an opening therein, a hollow sheave rotatably mounted within said case, said sheave including a hollow hub having an opening in its side in radial alignment with the opening in the side wall of the case, a flexible element adapted to be wound upon the hub of said sheave, an elongated locking rod of slightly lesser length than the internal diameter of said hub normally positioned within said hub, said locking rod being of a length greater than the distance between the surface of said hub and the side wall of said case in the vicinity of the opening in the side wall of the case, and means projecting from one end of said rod engageable with the internal surface of said hub to prevent withdrawal of said rod through the opening in the hub, said rod being normally positioned with its opposite end in the opening in the hub and said flexible element being attached to said opposite end whereby said flexible element upon being completely unwound from said sheave withdraws said locking rod from within said hub to the extent permitted by said projecting means and thus positions said opposite end of the locking rod in the opening in the side wall of said case to lock said hub against reverse rotation.

2. The construction set forth in claim 1 in which a flange extends inwardly within the hub adjacent the opening therethrough to provide a thrust point against which said locking rod may bear when withdrawn.

KENNETH A. BROWN.

REFERENCES CITED

The following references are of record in the file of this patent:

UNITED STATES PATENTS

| Number | Name | Date |
|---|---|---|
| 1,469,818 | Robertson | Oct. 9, 1923 |
| 1,566,740 | Forrest | Dec. 22, 1925 |
| 1,748,601 | Gottlieb | Feb. 25, 1930 |
| 1,807,582 | Brown | June 2, 1931 |
| 1,809,266 | Castro | June 9, 1931 |
| 1,814,912 | Geib | July 14, 1931 |
| 2,078,489 | Forss | Apr. 27, 1937 |
| 2,130,504 | McClane | Sept. 20, 1938 |
| 2,367,912 | Westfall | Jan. 23, 1945 |